US009695786B2

(12) United States Patent
Ge et al.

(10) Patent No.: US 9,695,786 B2
(45) Date of Patent: Jul. 4, 2017

(54) ENGINE INTAKE SYSTEM AND METHOD FOR OPERATING SAME

(71) Applicant: Caterpillar Inc., Peoria, IL (US)

(72) Inventors: Xinyu Ge, Peoria, IL (US); Fei Wang, Peoria, IL (US); Joshua Thurman, Princeville, IL (US)

(73) Assignee: Caterpillar Inc., Peoria, IL (US)

( * ) Notice: Subject to any disclaimer, the term of this patent is extended or adjusted under 35 U.S.C. 154(b) by 169 days.

(21) Appl. No.: 14/595,498

(22) Filed: Jan. 13, 2015

(65) Prior Publication Data

US 2016/0201617 A1    Jul. 14, 2016

(51) Int. Cl.
| | |
|---|---|
| *F02B 33/44* | (2006.01) |
| *F02M 31/083* | (2006.01) |
| *F02B 37/12* | (2006.01) |
| *F02M 31/087* | (2006.01) |
| *F02D 41/40* | (2006.01) |
| *F02B 37/16* | (2006.01) |

(Continued)

(52) U.S. Cl.
CPC ......... *F02M 31/083* (2013.01); *F02B 37/127* (2013.01); *F02B 37/16* (2013.01); *F02D 41/0007* (2013.01); *F02D 41/401* (2013.01); *F02M 31/087* (2013.01); *F02M 31/093* (2013.01); *F02D 41/064* (2013.01); *F02D 41/402* (2013.01); *F02D 2200/0414* (2013.01); *F02D 2250/38* (2013.01); *Y02T 10/126* (2013.01); *Y02T 10/144* (2013.01); *Y02T 10/44* (2013.01)

(58) Field of Classification Search
CPC .... F02M 31/083; F02M 31/087; F02B 37/127
USPC ........................... 60/611, 606, 597–598, 274
See application file for complete search history.

(56) References Cited

U.S. PATENT DOCUMENTS 3,103,780 A * 9/1963 Tryhorn .................... F01N 3/34
60/606
3,553,961 A * 1/1971 McReynolds ........... F02B 41/00
60/274

(Continued)

FOREIGN PATENT DOCUMENTS

| DE | 102013003457 A1 | 9/2014 |
|---|---|---|
| JP | 60113058 A | 6/1985 |

(Continued)

*Primary Examiner* — Thai Ba Trieu
(74) *Attorney, Agent, or Firm* — Hibshman Claim Construction PLLC (57) ABSTRACT

An engine system includes an internal combustion engine having an intake duct and an exhaust duct; a flow control module fluidly coupled to the intake duct; a compressor in fluid communication with the intake duct via the flow control module; a heat exchanger having an exhaust flow path in fluid communication with the exhaust duct, and having an oxidizer flow path, an outlet of the compressor being in selective fluid communication with the intake duct via the flow control module and the oxidizer flow path of the heat exchanger; a first temperature sensor in fluid communication with the intake duct; and a controller operatively coupled to the flow control module and the first temperature sensor, the controller being configured to actuate the flow control module between a first configuration and a second configuration based at least in part on a signal from the first temperature sensor.

19 Claims, 9 Drawing Sheets

(51) Int. Cl.
*F02M 31/093* (2006.01)
*F02D 41/00* (2006.01)
*F02D 41/06* (2006.01)

(56) References Cited

U.S. PATENT DOCUMENTS

| | | | | |
|---|---|---|---|---|
| 3,826,078 | A | * 7/1974 | Quigg | F02C 3/36 60/39.511 |
| 4,122,679 | A | 10/1978 | Charron | |
| 4,179,880 | A | * 12/1979 | Schirmer | F02C 7/08 60/39.23 |
| 4,333,424 | A | 6/1982 | McFee | |
| 4,907,406 | A | * 3/1990 | Kirikami | F04D 27/023 60/39.182 |
| 5,094,198 | A | 3/1992 | Trotta et al. | |
| 5,655,506 | A | 8/1997 | Hollis | |
| 6,138,645 | A | 10/2000 | Joppig et al. | |
| 6,397,597 | B1 | 6/2002 | Gartner | |
| 6,470,670 | B2 | * 10/2002 | Maeding | F02K 9/48 60/259 |
| 6,536,419 | B2 | 3/2003 | Roley | |
| 7,201,127 | B2 | 4/2007 | Rockwell et al. | |
| 8,037,872 | B2 | 10/2011 | Holler et al. | |
| 8,091,359 | B2 | 1/2012 | Ulrey et al. | |
| 8,302,402 | B2 | 11/2012 | Boley et al. | |
| 8,413,438 | B2 | 4/2013 | Pursifull et al. | |
| 8,926,917 | B2 | * 1/2015 | Maslov | F02C 3/20 165/108 |
| 8,980,192 | B2 | * 3/2015 | Maslov | F02C 3/20 165/108 |
| 2009/0271094 | A1 | 10/2009 | Stablein et al. | |
| 2010/0043428 | A1 | 2/2010 | Stablein et al. | |
| 2011/0030661 | A1 | 2/2011 | Rodriguez et al. | |
| 2011/0271936 | A1 | 11/2011 | Reyenga et al. | |

FOREIGN PATENT DOCUMENTS

| | | |
|---|---|---|
| JP | 61277171 A * | 12/1986 |
| JP | 2002-021653 A | 1/2002 |

* cited by examiner

ENGINE INTAKE SYSTEM AND METHOD FOR OPERATING SAME

TECHNICAL FIELD

This patent disclosure relates generally to internal combustion engines and, more particularly, to an intake system for an internal combustion engine and methods for operating the same.

BACKGROUND

Reciprocating internal combustion (IC) engines are known for converting chemical energy stored in a fuel supply into mechanical shaft power. A fuel-oxidizer mixture is received in a variable volume of an IC engine defined by a piston translating within a cylinder bore. The fuel-oxidizer mixture burns inside the variable volume to convert chemical energy from the mixture into heat. In turn, expansion of the combustion products within the variable volume performs work on the piston, which may be transferred to an output shaft of the IC engine.

Variations in the temperature of an oxidizer stream entering an engine are known to affect engine performance. For example, heat exchangers may be used to cool an oxidizer stream to increase engine power, increase engine efficiency, or both, especially when the engine includes a compressor to boost the pressure of the oxidizer upstream of the variable volume. Such intake heat exchangers may effect thermal communication between the oxidizer stream and a flow of ambient air or a flow of engine coolant, for example. Alternatively, a fluid, such as liquid water, may be injected into the oxidizer stream to cool the oxidizer stream by evaporation therein.

U.S. Pat. No. 8,091,359 (the '359 patent), entitled "Exhaust Heat Recovery for Engine Heating and Exhaust Cooling," purports to address the problem of higher emissions and energy losses such as viscous energy losses due to a relatively cool temperature of fluids during cold starts of an internal combustion engine. The '359 patent describes heating intake air via a gas-to-gas heat exchanger, the gas-to-gas heat exchanger being in communication with exhaust gases, and heating a fluid which flows through the engine with the intake air via a gas-to-liquid heat exchanger.

However, intake air is only drawn through the gas-to-gas heat exchanger of the '359 patent when the engine is operating without pressure boost from the compressor. Accordingly, there is a need for an improved engine intake systems and methods for operating engine intake systems to address the aforementioned problems and/or other problems in the art.

SUMMARY

According to an aspect of the disclosure, an engine system comprises an internal combustion engine having an intake duct and an exhaust duct; a flow control module fluidly coupled to the intake duct; a compressor in fluid communication with the intake duct via the flow control module; a heat exchanger having an exhaust flow path in fluid communication with the exhaust duct, and having an oxidizer flow path, an outlet of the compressor being in selective fluid communication with the intake duct via the flow control module and the oxidizer flow path of the heat exchanger; a first temperature sensor in fluid communication with the intake duct; and a controller operatively coupled to the flow control module and the first temperature sensor, the controller being configured to actuate the flow control module between a first configuration and a second configuration based at least in part on a signal from the first temperature sensor. The first configuration of the flow control module blocks fluid communication between the oxidizer flow path of the heat exchanger and the outlet of the compressor, and the second configuration of the flow control module effects fluid communication between the oxidizer flow path of the heat exchanger and the outlet of the compressor.

According to another aspect of the disclosure, a method for operating an engine system is disclosed. The engine system includes an internal combustion engine having an intake duct and an exhaust duct, a flow control module fluidly coupled to the intake duct, a compressor in fluid communication with the intake duct via the flow control module, and a heat exchanger having an exhaust flow path in fluid communication with the exhaust duct, and having an oxidizer flow path, an outlet of the compressor being in selective fluid communication with the intake duct via the flow control module and the oxidizer flow path of the heat exchanger. The method comprises actuating the flow control module between a first configuration and a second configuration based at least in part on an oxidizer temperature. The first configuration of the flow control module blocks fluid communication between the oxidizer flow path of the heat exchanger and the outlet of the compressor, and the second configuration of the flow control module effects fluid communication between the oxidizer flow path of the heat exchanger and the outlet of the compressor.

DETAILED DESCRIPTION

Aspects of the disclosure will now be described in detail with reference to the drawings, wherein like reference numbers refer to like elements throughout, unless specified otherwise.

Figure 1:
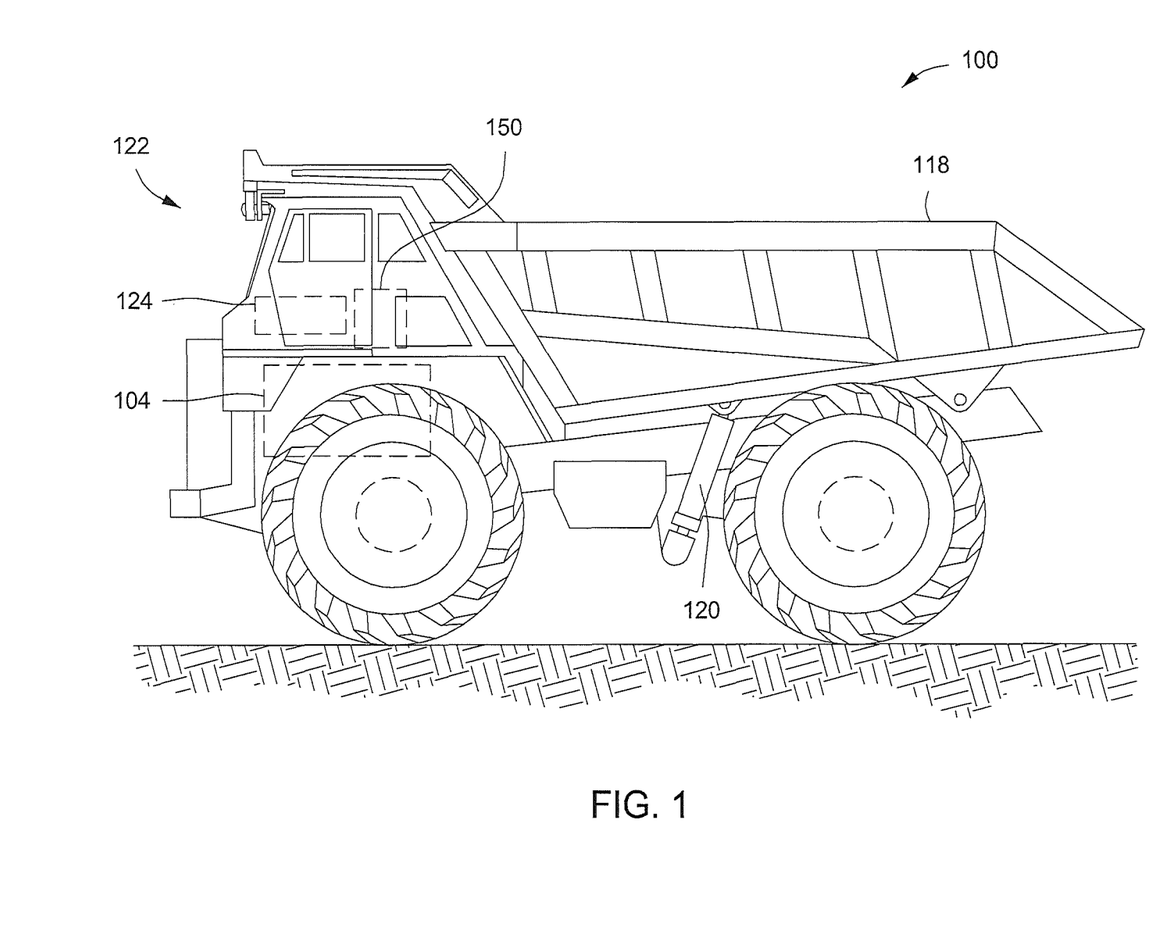
FIG. 1 shows a side view of a machine, according to an aspect of the disclosure.

FIG. 1 shows a side view of a machine 100, according to an aspect of the disclosure. The machine 100 is powered by an internal combustion (IC) engine 104. The IC engine 104 may be a reciprocating internal combustion engine, such as a compression ignition engine or a spark ignition engine, for example, or a rotating internal combustion engine, such as a gas turbine, for example.

The machine 100 may also include a work implement 118 driven by an actuator 120. The work implement 118 could be a dump bed, a shovel, a drill, a fork lift, a feller buncher, a conveyor, or any other implement known in the art for performing work on a load. The actuator 120 may be a hydraulic actuator, such as a linear hydraulic actuator or a hydraulic motor, an electric motor, a pneumatic actuator, combinations thereof, or any other actuator known in the art.

The machine may include a cab 122 configured to accommodate an operator, and have a user interface 124 including input devices for asserting control over the machine 100. The user interface 124 may include pedals, wheels, joysticks, buttons, touch screens, combinations thereof, or any other user input device known in the art. Alternatively or additionally, the user interface 124 may include provisions for receiving control inputs remotely from the cab 122, including wired or wireless telemetry, for example.

The machine 100 includes a controller 150 operatively coupled to the user interface 124 for effecting control actions based at least in part on inputs from the user interface 124. It will be appreciated that the controller 150 may also effect either open-loop or closed-loop control actions based on inputs from sensors, operating maps stored therein, combinations thereof, or any other control inputs known in the art.

The machine 100 can be an "over-the-road" vehicle such as a truck used in transportation or may be any other type of machine that performs some type of operation associated with an industry such as mining, construction, farming, transportation, or any other industry known in the art. For example, the machine may be an off-highway truck, a railway locomotive, a marine vehicle, an earth-moving machine, such as a wheel loader, excavator, dump truck, backhoe, motor grader, material handler, or the like. The term "machine" can also refer to stationary equipment like a generator that is driven by an internal combustion engine to generate electricity or shaft power, for example. The specific machine 100 illustrated in FIG. 1 is a dump truck having a dump bed 118 actuated by a linear hydraulic cylinder 120.

Figure 2:
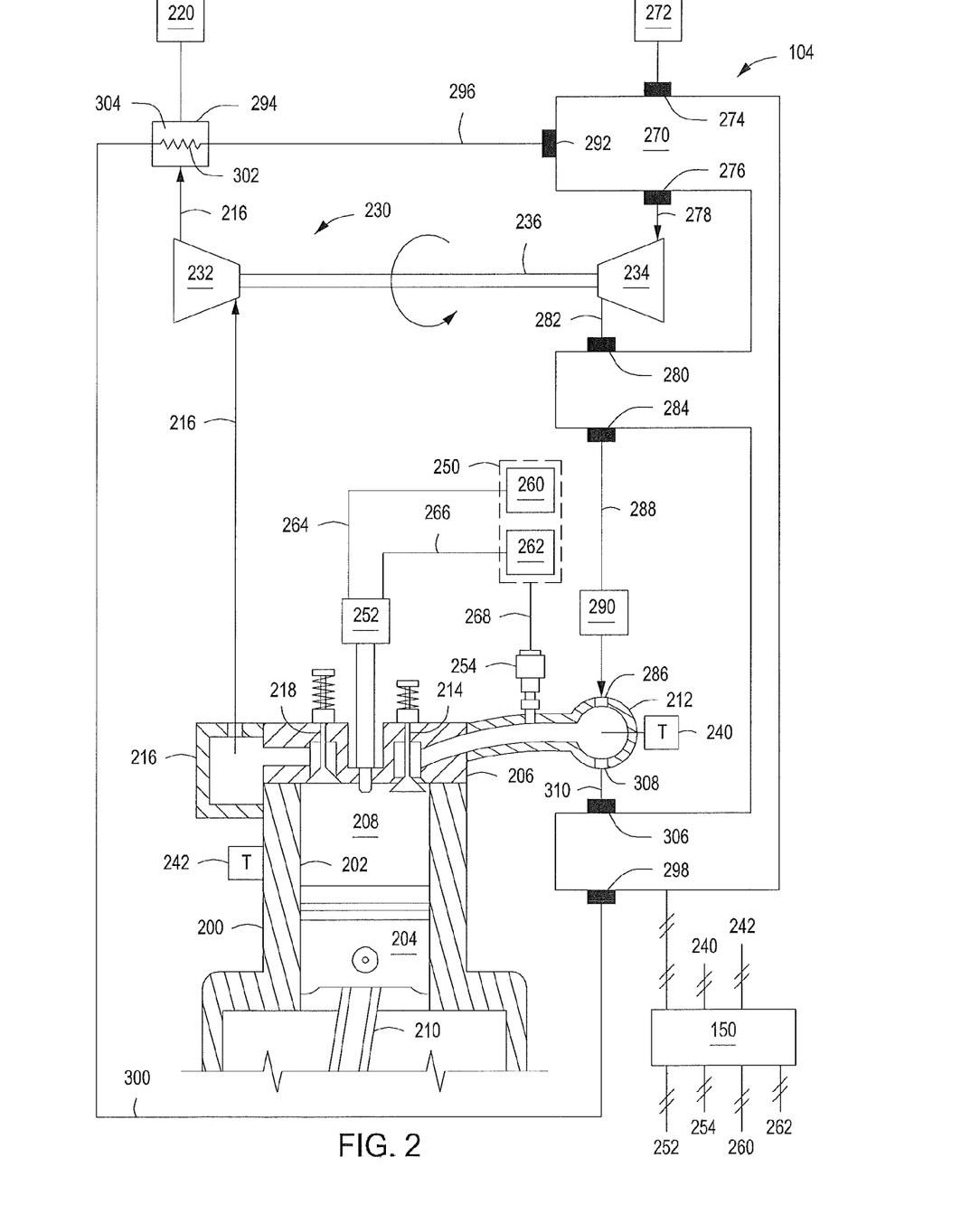
FIG. 2 shows a schematic view of an IC engine, according to an aspect of the disclosure.

FIG. 2 shows a schematic view of an IC engine 104, according to an aspect of the disclosure. The IC engine 104 includes a block 200 defining at least one cylinder bore 202 therein, at least one piston 204 disposed in sliding engagement with the cylinder bore 202, and a head 206 disposed on the block 200. The cylinder bore 202, the piston 204, and the head 206 define a combustion chamber 208. A volume of the combustion chamber 208 may vary with the location of the piston 204 relative to the head 206, such that the volume of the combustion chamber 208 is at a maximum when the piston 204 is located at Bottom Dead Center (BDC) of its stroke, and the volume of the combustion chamber 208 is at a minimum when the piston 204 is located at Top Dead Center (TDC) of its stroke.

The IC engine 104 may operate according to a four-stroke cycle, including an intake stroke (TDC to BDC), a compression stroke (BDC to TDC), an expansion stroke (TDC to BDC), and an exhaust stroke (BDC to TDC). Alternatively, the IC engine 104 may operate according to a two-stroke cycle, including a compression/exhaust stroke (BDC to TDC) and an expansion/exhaust/intake stroke (TDC to BDC).

The piston 204 is pivotally connected to a crankshaft (not shown) via a connecting rod 210 for transmitting mechanical power therebetween. Although only one piston 204 and cylinder bore 202 are shown in FIG. 2, it will be appreciated that the IC engine 104 may be configured to include any number of pistons and cylinder bores to suit a particular design or application.

The IC engine 104 receives a flow of oxidizer from an intake duct 212. One or more intake valves 214 effect selective fluid communication between the intake duct 212 and the combustion chamber 208. The IC engine 104 discharges a flow of exhaust to an exhaust duct 216. One or more exhaust valves 218 effect selective fluid communication between the combustion chamber 208 and the exhaust duct 216. The intake valves 214 and the exhaust valves 218 may be actuated by a cam/push-rod/rocker arm assembly (not shown), a solenoid actuator, a hydraulic actuator, combinations thereof, or by any other cylinder valve actuator known in the art to open or close intake and exhaust valves.

The exhaust duct 216 may incorporate one or more exhaust aftertreatment modules 220 for trapping exhaust constituents, converting an exhaust constituent from one composition to another composition, or both. The one or more exhaust aftertreatment modules 220 may include a particulate filter, a nitrogen oxides (NOx) conversion module, an oxidation catalyst, combinations thereof, or any other exhaust aftertreatment device known in the art.

According to an aspect of the disclosure, the IC engine 104 includes a turbocharger 230 having a turbine 232 operably coupled to a compressor 234 via a shaft 236. The turbine 232 receives a flow of exhaust gas via the exhaust duct 216 and extracts mechanical work from the exhaust gas by expansion of the exhaust gas therethrough. The mechanical work extracted from the turbine 232 from the flow of exhaust gas is transmitted to the compressor 234 via the shaft 236. The compressor 234 receives a flow of oxidizer, such as, for example, ambient air, and performs work on the flow of oxidizer by compression thereof. The flow of compressed oxidizer is discharged from the compressor 234 and delivered to the combustion chamber 208 via the intake duct 212.

The IC engine 104 receives combustible fuel from a fuel supply system 250. The fuel supply system 250 may include fuel storage, compressors, pumps, valves, regulators, instrumentation, or any other elements known in the art to be useful for supplying a flow of fuel. The IC engine 104 includes a direct fuel injector 252 disposed in direct fluid communication with the combustion chamber 208, a port fuel injector 254 disposed in the intake duct 212 upstream of the intake valve 214, combinations thereof, or any other fuel injector arrangement known in the art. The direct fuel injector 252 and the port fuel injector 254 may each be operatively coupled to the controller 150 for control thereof.

The fuel supply system 250 may include a first fuel supply 260, a second fuel supply 262, or both. The direct fuel injector 252 may be in fluid communication with the first fuel supply 260 via a first fuel conduit 264, the second fuel supply 262 via a second fuel conduit 266, or both. The port fuel injector 254 may be in fluid communication with the second fuel supply 262 via a third fuel conduit 268.

According to an aspect of the disclosure, the first fuel supply 260 is a liquid fuel supply that delivers a liquid fuel to the combustion chamber 208. The liquid fuel may include distillate diesel, biodiesel, dimethyl ether, ethanol, methanol, seed oils, liquefied natural gas (LNG), liquefied petroleum gas (LPG), Fischer-Tropsch derived fuel, combinations thereof, or any other combustible liquid known in the art to have a sufficiently high octane value and a sufficiently low cetane value to enable compression ignition in a reciprocating IC engine. According to another aspect of the disclosure, the first fuel supply 260 is a distillate diesel fuel supply.

According to an aspect of the disclosure, the second fuel supply 262 is a gaseous fuel supply that delivers a gaseous fuel to the combustion chamber 208. The gaseous fuel may include natural gas, methane, propane, hydrogen, biogas, syngas, combinations thereof, or any other combustible gas known in the art. According to another aspect of the disclosure, the gaseous fuel is natural gas. According to yet another aspect of the disclosure, the gaseous fuel is a combustible gas comprising at least 50% methane by mole.

The direct fuel injector 252 is configured to effect selective fluid communication between the fuel supply system 250 and the combustion chamber 208. For example, the direct fuel injector 252 may assume any one of the following four fluid configurations. According to a first configuration, the direct fuel injector 252 blocks fluid communication between both the first fuel supply 260 and the second fuel supply 262, and the combustion chamber 208. According to a second configuration, the direct fuel injector 252 blocks fluid communication between the first fuel supply 260 and the combustion chamber 208 and effects fluid communication between the second fuel supply 262 and the combustion chamber 208. According to a third configuration, the direct fuel injector 252 effects fluid communication between the first fuel supply 260 and the combustion chamber 208 and blocks fluid communication between the second fuel supply 262 and the combustion chamber 208. According to a fourth configuration, the direct fuel injector 252 effects fluid communication between both the first fuel supply 260 and the second fuel supply 262, and the combustion chamber 208.

The direct fuel injector 252 may include an actuator configured to change the fluid configuration of the direct fuel injector 252 under the control of the controller 150. The actuator for the direct fuel injector 252 may include a solenoid actuator, a hydraulic actuator, a pneumatic actuator, a mechanical actuator, such as, for example a cam actuator, combinations thereof, or any other fuel injector actuator known in the art.

Similarly, the port fuel injector 254 is configured to effect selective fluid communication between the fuel supply system 250 and the combustion chamber 208. For example, the port fuel injector 254 may assume any one of the following two fluid configurations. According to a first configuration, the port fuel injector 254 blocks fluid communication between the second fuel supply 262 and the intake duct 212. According to a second configuration, the port fuel injector 254 effects fluid communication between the second fuel supply 262 and the intake duct 212.

The port fuel injector 254 may include an actuator configured to change the fluid configuration of the port fuel injector 254 under the control of the controller 150. The actuator for the port fuel injector 254 may include a solenoid actuator, a hydraulic actuator, a pneumatic actuator, a mechanical actuator, such as, for example a cam actuator, combinations thereof, or any other fuel injector actuator known in the art.

The IC engine 104 further includes a flow control module 270 for controlling oxidizer induction into the IC engine 104, as next discussed. The flow control module 270 is fluidly coupled to an oxidizer source 272 via a first module port 274. The oxidizer source 272 may include, for example, ambient air surrounding the IC engine 104 or machine 100, a pressurized source of air or other oxidizing fluid, or any other oxidizer source known in the art. The flow control module 270 is fluidly coupled to the compressor 234 via a second module port 276 and a compressor inlet conduit 278, and the flow control module 270 is configured to supply a flow of oxidizer to the compressor 234 by effecting fluid communication between the first module port 274 and the second module port 276.

The flow control module 270 is also coupled to the compressor 234 via a third module port 280 and a compressor outlet conduit 282. Accordingly, the flow control module is configured to receive a flow of oxidizer from the compressor 234 via the third module port 280.

A fourth module port 284 of the flow control module 270 is fluidly coupled to a first intake port 286 of the intake duct 212 via a first intake conduit 288. The first intake conduit 288 may optionally include a heat exchanger 290 that is configured to extract heat from a flow of oxidizer through the first intake conduit 288, conduct heat into a flow of oxidizer through the first intake conduit 288, or combinations thereof. The heat exchanger 290 may effect heat transfer with the flow of oxidizer via a heat transfer medium flowing therethrough, such as engine coolant or a flow of ambient air, for example.

A fifth module port 292 of the flow control module 270 is fluidly coupled to a heat exchanger 294 via a heat exchanger inlet conduit 296. A sixth module port 298 is fluidly coupled to the heat exchanger 294 via a heat exchanger outlet conduit 300, such that the heat exchanger inlet conduit 296 is in fluid communication with the heat exchanger outlet conduit 300 via an oxidizer flow path 302 of the heat exchanger 294.

An exhaust flow path 304 of the heat exchanger 294 is in fluid communication with the exhaust duct 216. The heat exchanger 294 is configured to effect thermal communication between the exhaust flow path 304 and the oxidizer flow path 302, thereby effecting heat transfer between a flow through the oxidizer flow path 302 and a flow through the exhaust flow path 304. According to an aspect of the disclosure, the oxidizer flow path 302 is not in fluid communication with the exhaust flow path 304 within the heat exchanger 294, such that there is no mixing of fluid between the oxidizer flow path 302 and fluid from the exhaust flow path 304 within the heat exchanger 294.

A seventh module port 306 of the flow control module 270 is fluidly coupled to a second intake port 308 of the intake duct 212 via a second intake conduit 310. The flow control module 270 may be configured to effect selective fluid communication between the sixth module port 298 and the seventh module port 306. The selective fluid communication between the sixth module port 298 and the seventh module port 306 may be of a toggling nature between a blocked configuration and an open configuration, a proportional nature across a continuous or nearly continuous spectrum of flow resistance between a maximum flow resistance and a minimum flow resistance, or combinations thereof. Accordingly, the flow control module 270 may effect selective fluid communication between the oxidizer flow path 302 of the heat exchanger 294 and the second intake port 308 of the intake duct 212 via the sixth module port 298 and the seventh module port 306.

The flow control module 270 may effect selective fluid communication between the third module port 280 and the fourth module port 284, the second module port 276, the fifth module port 292, or combinations thereof. In one configuration, the flow control module 270 may admit some or all of the discharge flow from the compressor 234 to the first intake port 286 of the intake duct 212 by effecting fluid communication between the third module port 280 and the fourth module port 284. Alternatively, the flow control module 270 may block fluid communication between the compressor 234 and the first intake port 286 of the intake duct 212 by blocking fluid communication between the third module port 280 and the fourth module port 284.

In another configuration, the flow control module 270 may bypass a portion of the discharge flow from the compressor 234 away from the first intake port 286 of the intake duct 212 and recirculate the portion of discharge flow through the compressor 234 by effecting fluid communication between third module port 280 and the second module port 276. Alternatively, the flow control module 270 may block recirculation of flow through the compressor 234 by blocking fluid communication between the third module port 280 and the second module port 276.

In another configuration, the flow control module 270 may bypass some or all of the discharge flow from the compressor 234 away from the first intake port 286 of the intake duct 212 to the heat exchanger 294 by effecting fluid communication between the third module port 280 and the fifth module port 292. Alternatively, the flow control module 270 may block fluid communication between the compressor 234 and the heat exchanger 294 by blocking fluid communication between the third module port 280 and the fifth module port 292.

Further, it will be appreciated that the flow control module 270 may simultaneously recirculate oxidizer flow from the compressor outlet conduit 282 to the compressor inlet conduit 278, and bypass discharge flow from the compressor 234 away from the first intake port 286 to the heat exchanger 294, and may control the relative proportions of flow recirculated through the compressor 234 and flow delivered to the oxidizer flow path 302 of the heat exchanger 294.

The flow control module 270 may include valves, conduits, actuators, sensors, combinations thereof, or any other fluid control structures known in the art to effect any of the fluid communication states described herein. Moreover, the flow control module 270 may be operatively coupled to the controller 150, such that the controller 150 may cause the flow control module 270 to effect any of the states of fluid communication described herein.

An intake temperature sensor 240 may be thermally coupled to the intake duct 212 for measurement of the temperature of an oxidizer flowing therethrough. An engine 104 fluid temperature sensor 242 may be thermally coupled to an auxiliary fluid system of the engine 104, for example, a cooling fluid circuit or a lubrication fluid circuit, for measurement of the temperature of an engine fluid flowing therethrough. The intake temperature sensor 240, the engine fluid temperature sensor 242, or both, may be operatively coupled to the controller 150, such that the controller 150 may receive signals corresponding to the respective sensor measurement.

Figure 3:
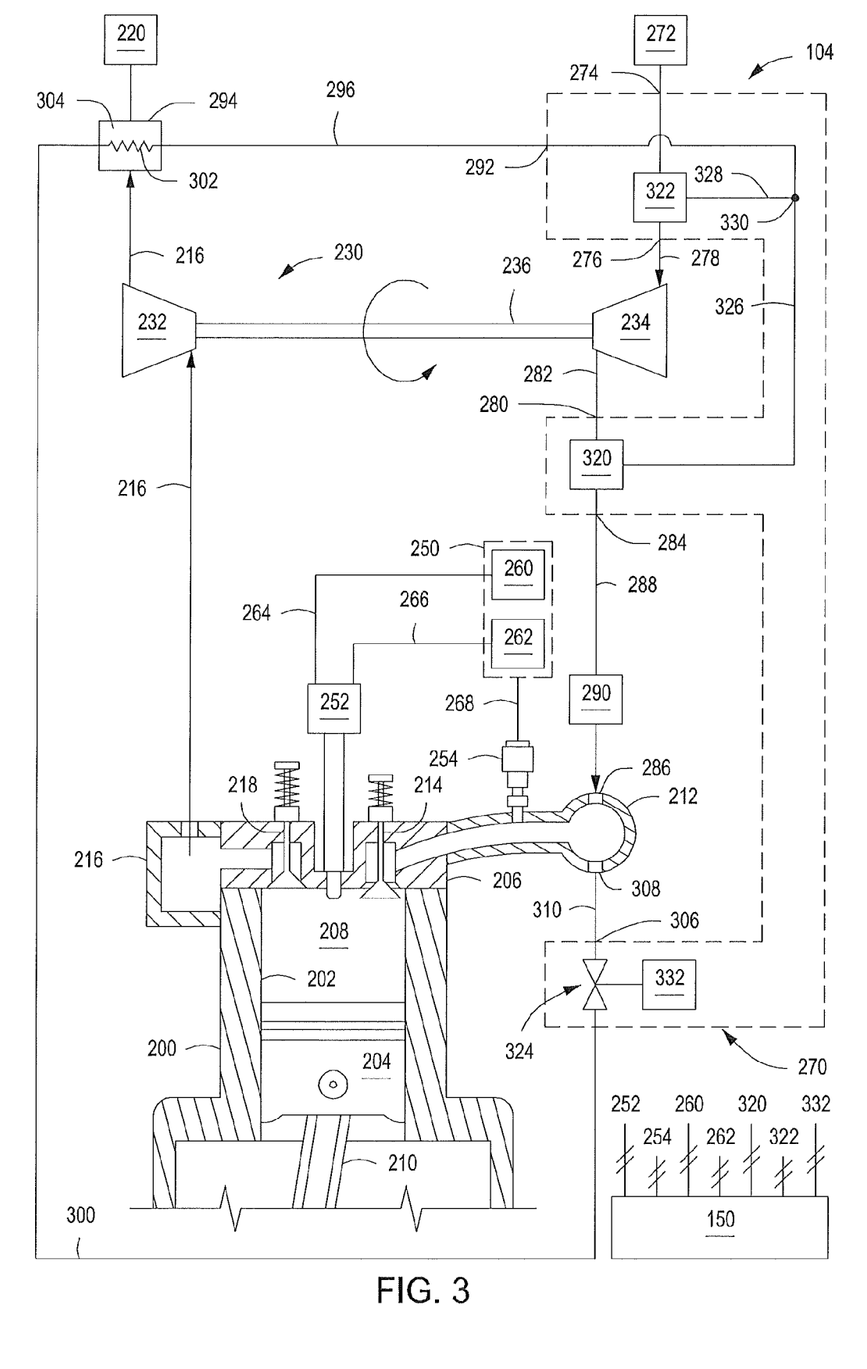
FIG. 3 shows a schematic view of an IC engine, according to an aspect of the disclosure.

FIG. 3 shows a schematic view of an IC engine 104, according to an aspect of the disclosure. Similar to FIG. 2, the IC engine 104 illustrated in FIG. 3 includes an oxidizer source 272, a compressor 234, an intake duct 212, and a heat exchanger 294 fluidly coupled to a flow control module 270. In addition, the flow control module 270 of FIG. 3 includes a bypass valve assembly 320, a recirculation valve assembly 322, and an oxidizer heating valve 324.

The bypass valve assembly 320 is fluidly coupled to the compressor 234 via the third module port 280 and the compressor outlet conduit 282, the first intake port 286 of the intake duct 212 via the fourth module port 284 and the first intake conduit 288, and a bypass conduit 326. The bypass conduit 326 is in fluid communication with a recirculation conduit 328 and the heat exchanger inlet conduit 296 via a fluid node 330. The bypass valve assembly 320 is configured to effect or block fluid communication between the compressor outlet conduit 282 and the first intake conduit 288, the compressor outlet conduit 282 and the bypass conduit 326, or combinations thereof.

According an aspect of the disclosure, the bypass valve assembly 320 is configured to adjust a relative proportion of the compressor 234 discharge flow received from the compressor outlet conduit 282 and the first intake conduit 288 and the bypass conduit 326. According to another aspect of the disclosure, the bypass valve assembly 320 is configured to block fluid communication between the compressor outlet conduit 282 and the bypass conduit 326, thereby directing all of the compressor 234 discharge flow to the first intake conduit 288. According to another aspect of the disclosure, the bypass valve assembly 320 is configured to block fluid communication between the compressor outlet conduit 282 and the first intake conduit 288, thereby directing all of the compressor 234 discharge flow to the bypass conduit 326. The bypass valve assembly 320 may be operatively coupled to the controller 150, such that the controller 150 may cause the bypass valve assembly 320 to affect any of the fluid communication states described herein.

The recirculation valve assembly 322 is fluidly coupled to the oxidizer source 272, the recirculation conduit 328, and the compressor inlet conduit 278. The recirculation valve assembly 322 is configured to effect or block fluid communication between the compressor inlet conduit 278 and the oxidizer source 272, the compressor inlet conduit 278 and the recirculation conduit 328, or combinations thereof.

According to an aspect of the disclosure, the recirculation valve assembly 322 is configured to adjust a relative proportion of the compressor 234 inlet flow received from the oxidizer source 272 and the recirculation conduit 328. According to another aspect of the disclosure, the recirculation valve assembly 322 is configured to block fluid communication between the recirculation conduit 328 and the compressor inlet conduit 278, thereby providing all of the compressor 234 inlet flow from the oxidizer source 272. According to another aspect of the disclosure, the recirculation valve assembly 322 is configured to always provide at least a portion of the compressor 234 inlet flow from the oxidizer source 272.

As illustrated in FIG. 3, the oxidizer heating valve 324 is fluidly coupled to the heat exchanger outlet conduit 300 and the second intake conduit 310, and therefore disposed downstream of the heat exchanger 294. In one configuration, the oxidizer heating valve 324 effects fluid communication between the heat exchanger outlet conduit 300 and the second intake conduit 310, and in another configuration, the oxidizer heating valve 324 blocks fluid communication between the heat exchanger outlet conduit 300 and the second intake conduit 310.

The oxidizer heating valve 324 may include an actuator 332 that is configured to effect any of the fluid communication states for the oxidizer heating valve 324 described herein. The actuator 332 may be an electric actuator, a pneumatic actuator, a hydraulic actuator, combinations thereof, or any other valve actuator known in the art. Further, the actuator 332 may be operatively coupled to the controller 150, such that the controller 150 may cause the actuator 332 to effect any of the fluid communication states for the oxidizer heating valve 324 described herein.

Figure 4:
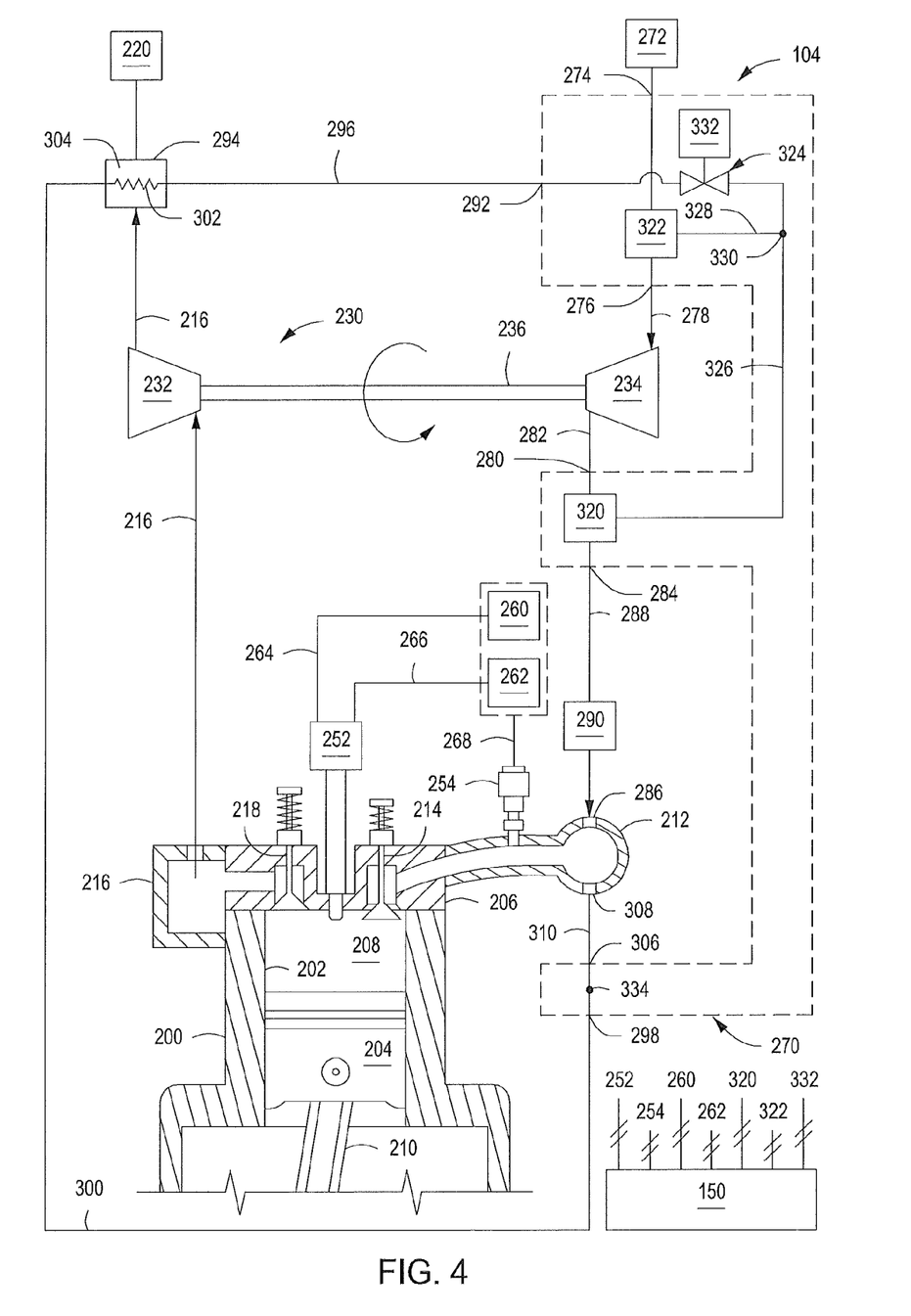
FIG. 4 shows a schematic view of an IC engine, according to an aspect of the disclosure.

FIG. 4 shows a schematic view of an IC engine 104, according to an aspect of the disclosure. Similar to FIG. 3, the IC engine 104 illustrated in FIG. 4 includes an oxidizer source 272, a compressor 234, an intake duct 212, and a heat exchanger 294 fluidly coupled to a flow control module 270.

Also similar to FIG. 3, the flow control module 270 in FIG. 4 includes a bypass valve assembly 320, a recirculation valve assembly 322, and an oxidizer heating valve 324. However, the oxidizer heating valve 324 of FIG. 4 is in fluid communication with the heat exchanger inlet conduit 296 and the bypass conduit 326 via the fluid node 330, and therefore is located upstream of the heat exchanger 294. It will be appreciated that the oxidizer heating valve 324 shown in FIG. 4 may have some or all of the structural or functional attributes described for the oxidizer heating valve 324 in FIG. 3. Further according to the aspect illustrated in FIG. 4, the second intake conduit 310 is coupled to the heat exchanger outlet conduit 300 at a fluid node 334.

Figure 5:
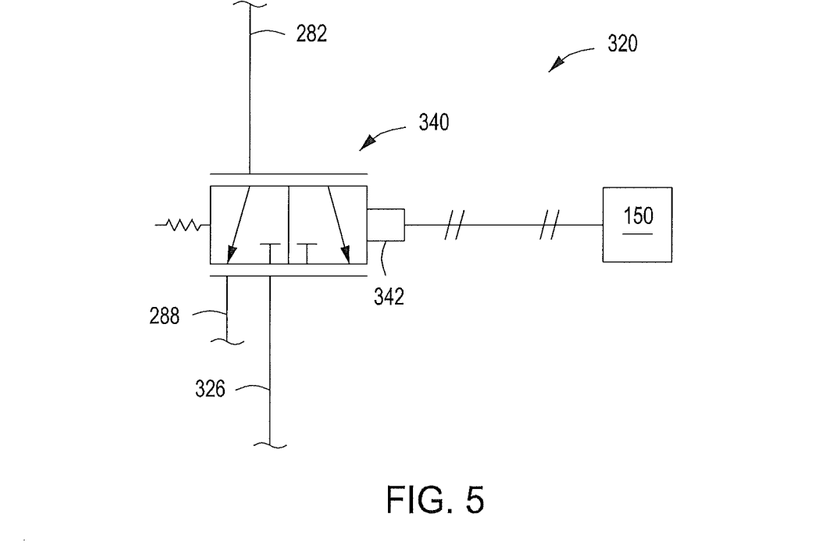
FIG. 5 shows a schematic view of a bypass valve assembly, according to an aspect of the disclosure.

FIG. 5 shows a schematic view of a bypass valve assembly 320, according to an aspect of the disclosure. As a non-limiting example, the bypass valve assembly 320 may include a three-port, two-position valve 340 illustrated in FIG. 5. The valve 340 is fluidly coupled to the compressor outlet conduit 282, the first intake conduit 288, and the bypass conduit 326. In a first configuration, the valve 340 effects fluid communication between the compressor outlet conduit 282 and the first intake conduit 288, and blocks fluid communication between the compressor outlet conduit 282 and the bypass conduit 326. In a second configuration, the valve 340 blocks fluid communication between the compressor outlet conduit 282 and the first intake conduit 288, and effects fluid communication between the compressor outlet conduit 282 and the bypass conduit 326. According to an aspect of the disclosure, the valve 340 may also assume one or more configurations between the first configuration and the second configuration, such that flow from the compressor outlet conduit 282 may be allocated to both the first intake conduit 288 and the bypass conduit 326 in desired proportion.

The valve 340 may include an actuator 342 that is configured to effect any of the configurations for the valve 340 described herein. The actuator 342 may be an electric actuator, a pneumatic actuator, a hydraulic actuator, combinations thereof, or any other valve actuator known in the art. Further, the actuator 342 may be operably coupled to the controller 150, and the controller 150 may cause the actuator 342 to effect any of the configurations for the valve 340 described herein.

Figure 6:
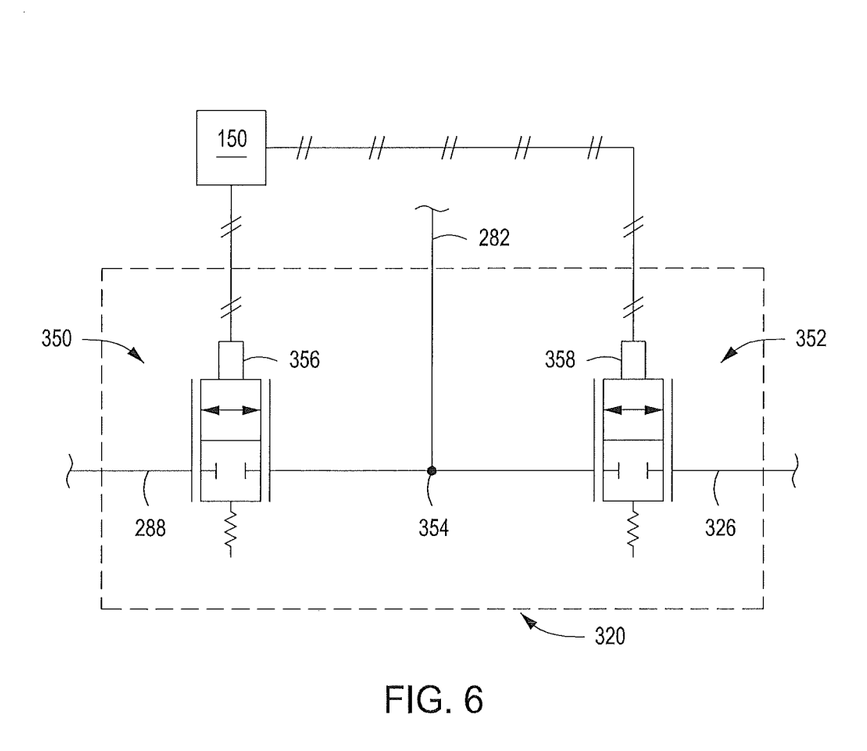
FIG. 6 shows a schematic view of a bypass valve assembly, according to an aspect of the disclosure.

FIG. 6 shows a schematic view of a bypass valve assembly 320, according to an aspect of the disclosure. As a non-limiting example, the bypass valve assembly 320 may include a first bypass valve 350 and a second bypass valve 352, as shown in FIG. 6. Either the first bypass valve 350, the second bypass valve 352, or both, may be a two-port, two-position valve.

The first bypass valve 350 is fluidly coupled to the first intake conduit 288 and the compressor outlet conduit 282 via a fluid node 354. The second bypass valve 352 is fluidly coupled to the bypass conduit 326 and the compressor outlet conduit 282 via the fluid node 354.

A first configuration of the first bypass valve 350 may block fluid communication between the compressor outlet conduit 282 and the first intake conduit 288, and a second configuration of the first bypass valve 350 may effect fluid communication between the compressor outlet conduit 282 and the first intake conduit 288. A first configuration of the second bypass valve 352 may block fluid communication between the compressor outlet conduit 282 and the bypass conduit 326, and a second configuration of the second bypass valve 352 may effect fluid communication between the compressor outlet conduit 282 and the bypass conduit 326.

The first bypass valve 350 may include an actuator 356 that is configured to effect any of the configurations for the first bypass valve 350 described herein. The second bypass valve 352 may include an actuator 358 that is configured to effect any of the configurations of the second bypass valve 352 described herein. Either the actuator 356 or the actuator 358 may be an electric actuator, a pneumatic actuator, a hydraulic actuator, combinations thereof, or any other valve actuator known in the art. Further, either the actuator 356 or the actuator 358 may be operatively coupled to the controller 150, such that the controller 150 may cause either the actuator 356 or the actuator 358 to effect any of the configurations for the first bypass valve 350 or the second bypass valve 352, respectively, disclosed herein.

Figure 7:
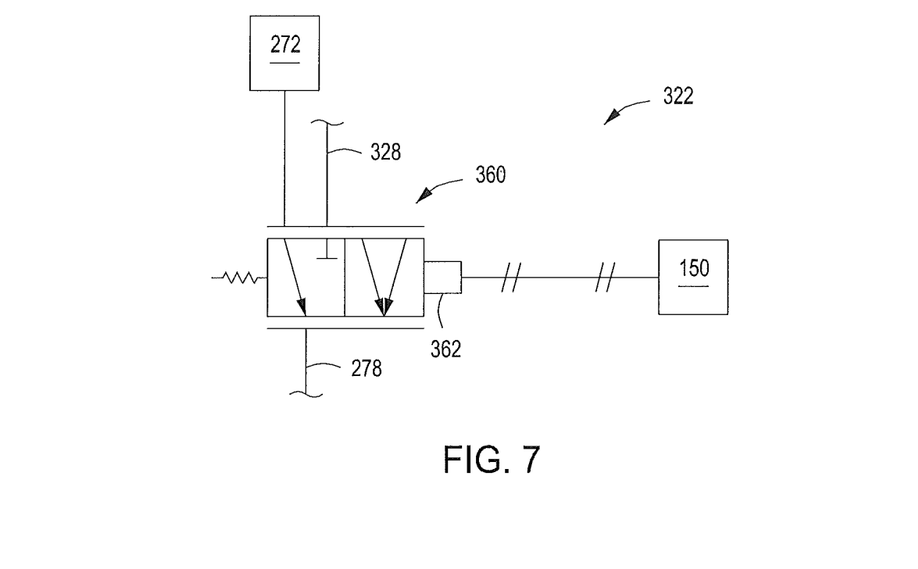
FIG. 7 shows a schematic view of a recirculation valve assembly, according to an aspect of the disclosure.

FIG. 7 shows a schematic view of a recirculation valve assembly 322, according to an aspect of the disclosure. As a non-limiting example, the recirculation valve assembly 322 may include a three-port, two-position valve 360 illustrated in FIG. 7. The valve 360 is fluidly coupled to the compressor inlet conduit 278, the oxidizer source 272, and the recirculation conduit 328. In a first configuration, the valve 360 effects fluid communication between the compressor inlet conduit 278 and the oxidizer source 272, and blocks fluid communication between the compressor inlet conduit 278 and the recirculation conduit 328. In a second configuration, the valve 360 effects fluid communication between the compressor inlet conduit 278 and both the oxidizer source 272 and the recirculation conduit 328. According to an aspect of the disclosure, the valve 360 may also assume one or more configurations between the first configuration and the second configuration, such that flow to the compressor inlet conduit 278 may be allocated from both the oxidizer source 272 and the recirculation conduit 328 in desired proportion. According to another aspect of the disclosure, the configuration of the valve 360 that is most restrictive between the compressor inlet conduit 278 and the oxidizer source 272 does not block fluid communication between the compressor inlet conduit 278 and the oxidizer source 272.

The valve 360 may include an actuator 362 that is configured to effect any of the configurations for the valve 360 described herein. The actuator 362 may be an electric actuator, a pneumatic actuator, a hydraulic actuator, combinations thereof, or any other valve actuator known in the art. Further, the actuator 362 may be operably coupled to the controller 150, and the controller 150 may cause the actuator 362 to effect any of the configurations for the valve 360 described herein.

Figure 8:
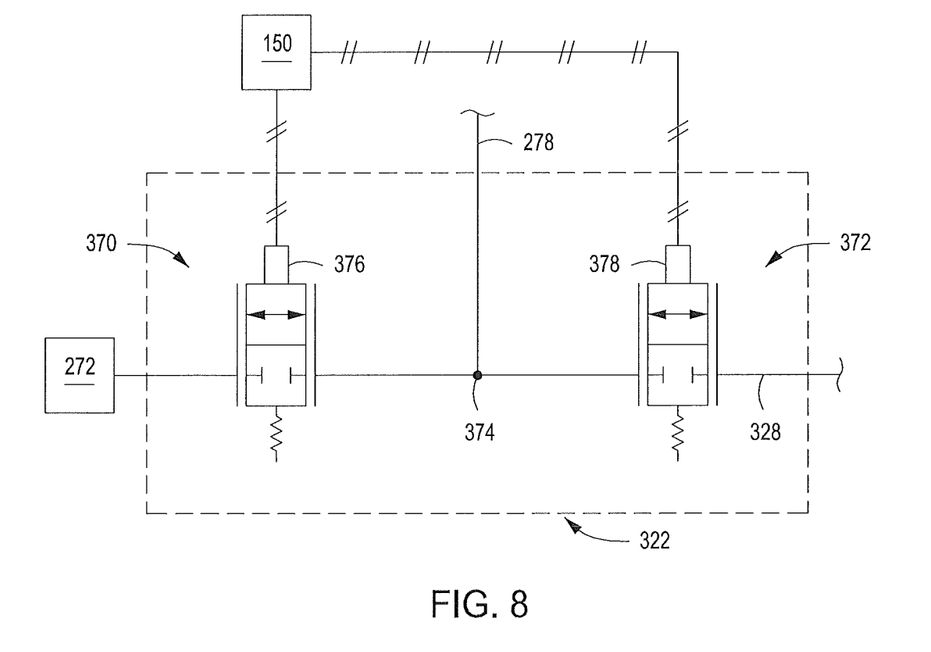
FIG. 8 shows a schematic view of a recirculation valve assembly, according to an aspect of the disclosure.

FIG. 8 shows a schematic view of a recirculation valve assembly 322, according to an aspect of the disclosure. As a non-limiting example, the recirculation valve assembly 322 may include a first recirculation valve 370 and a second recirculation valve 372, as shown in FIG. 8. Either the first recirculation valve 370, the second recirculation valve 372, or both, may be a two-port, two-position valve.

The first recirculation valve 370 is fluidly coupled to the oxidizer source 272 and the compressor inlet conduit 278 via a fluid node 374. The second recirculation valve 372 is fluidly coupled to the recirculation conduit 328 and the compressor inlet conduit 278 via the fluid node 374.

The first recirculation valve 370 may throttle fluid communication between the compressor inlet conduit 278 and the oxidizer source 272 over a continuous or substantially continuous range of flow restriction values. According to an aspect of the disclosure, a most restrictive configuration of the first recirculation valve 370 does not block fluid communication between the compressor inlet conduit 278 and the oxidizer source 272. A first configuration of the second recirculation valve 372 may block fluid communication between the compressor inlet conduit 278 and the recirculation conduit 328, and a second configuration of the second recirculation valve 372 may effect fluid communication between the compressor inlet conduit 278 and the recirculation conduit 328.

The first recirculation valve 370 may include an actuator 376 that is configured to effect any of the configurations for the first recirculation valve 370 described herein. The second recirculation valve 372 may include an actuator 378 that is configured to effect any of the configurations of the second recirculation valve 372 described herein. Either the actuator 376 or the actuator 378 may be an electric actuator, a pneumatic actuator, a hydraulic actuator, combinations thereof, or any other valve actuator known in the art. Further, either the actuator 376 or the actuator 378 may be operatively coupled to the controller 150, such that the controller 150 may cause either the actuator 376 or the actuator 378 to effect any of the configurations for the first recirculation valve 370 or the second recirculation valve 372, respectively, disclosed herein.

Figure 9:
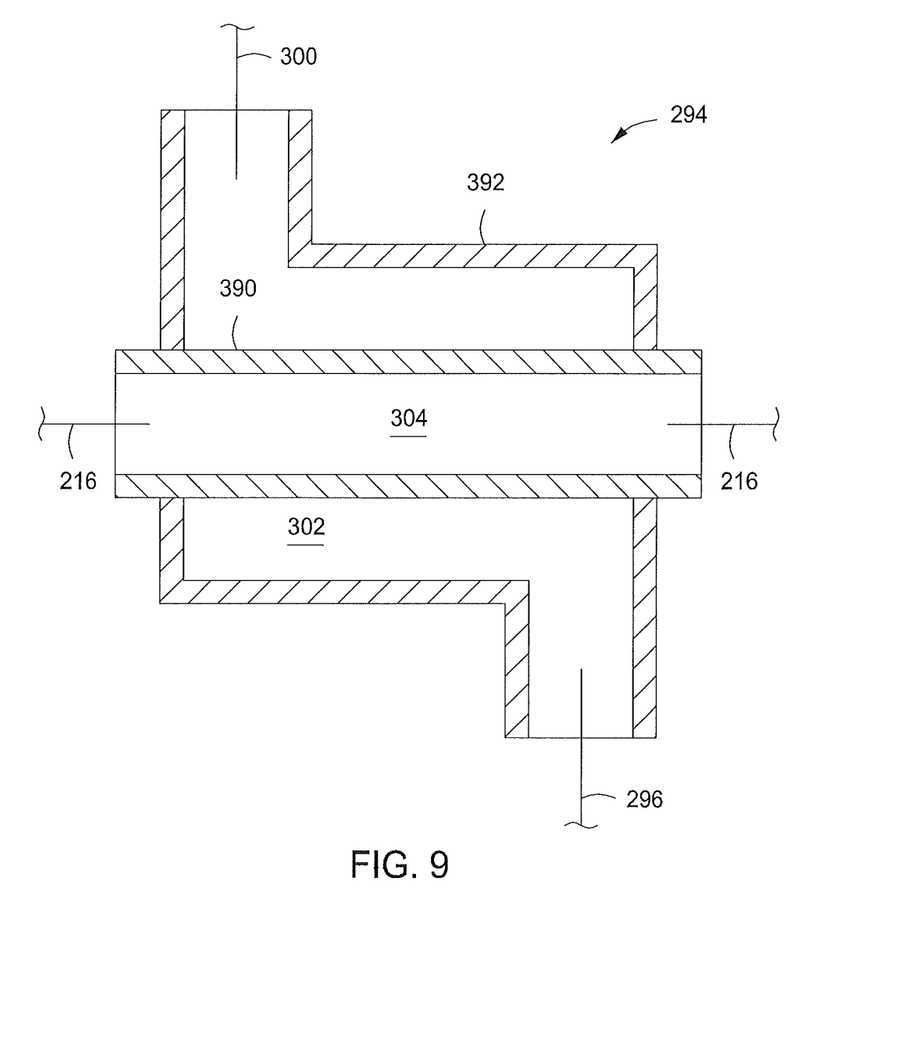
FIG. 9 shows a side cross sectional view of a heat exchanger, according to an aspect of the disclosure.

FIG. 9 shows a side cross sectional view of a heat exchanger 294, according to an aspect of the disclosure. The exhaust flow path 304 is defined within a tube structure 390, and the oxidizer flow path 302 is defined between a shell structure 392 and the tube structure 390. Accordingly, the oxidizer flow path 302 is in thermal communication with the exhaust flow path 304 through the wall of the tube structure 390. According to an aspect of the disclosure, the tube structure 390 is impermeable to both exhaust flow and oxidizer flow, such that the exhaust flow path 304 is not in fluid communication with the oxidizer flow path 302 within the heat exchanger 294.

INDUSTRIAL APPLICABILITY

The present disclosure is generally applicable to internal combustion engines and, more particularly applicable to oxidizer intake systems for internal combustion engines.

Applicants discovered that operation of compression ignition internal combustion engines at cold ambient conditions could result in emissions of so called "white smoke." The nature of white smoke may differ from that of conventional smoke in that white smoke may result from emission of gaseous hydrocarbons, whereas conventional smoke consists of more solid particulate matter. Applicants also discovered that increasing the intake manifold temperature at cold ambient conditions could help to mitigate white smoke. Increased intake temperatures mitigate white smoke in part by promoting more complete combustion within a combustion chamber of the engine, which in turn may also improve fuel efficiency during startup. Accordingly, Applicants sought ways to more rapidly increase the intake manifold temperature of compression ignition engines operating at cold ambient startup conditions.

Although increasing the intake manifold temperature during startup may decrease white smoke, lower intake manifold temperatures are desired once the engine has reached generally warmer, steady-state operating conditions, at least in part to mitigate formation of nitrogen oxides (hereinafter "NOx"). In fact, some engines may include a heat exchanger configured and arranged to extract heat away from an oxidizer flow upstream of the combustion chambers, thereby decreasing the temperature of the oxidizer flow. Thus, Applicants sought apparatus and methods for transferring heat into an oxidizer flow during startup conditions that would not conflict with the desire to decrease the temperature of the oxidizer flow after startup.

Conventional approaches have used engine coolant as a heat transfer medium for transferring heat into an oxidizer stream. However, engine coolant temperatures may not increase quickly enough at cold ambient conditions for use in heating an oxidizer stream to sufficiently mitigate white smoke. Similarly, the temperature of engine lubricating oil may not increase rapidly enough for use as a heat transfer fluid in mitigating white smoke. In turn, Applicants discovered that using engine exhaust may provide advantages as a heat transfer medium for increasing the intake manifold temperature during cold starts.

Applicants discovered that recirculating a portion of the discharge flow from an outlet of an engine oxidizer compressor, such as a compressor of a turbocharger or a supercharger, to an inlet of the oxidizer compressor acts to increase intake manifold temperature by successively performing additional work on the same oxidizer flow before delivering the oxidizer flow to a combustion chamber. Applicants further discovered that compressor recirculation flow may also act to more rapidly increase the temperature of exhaust leaving a combustion chamber.

Figure 10A:
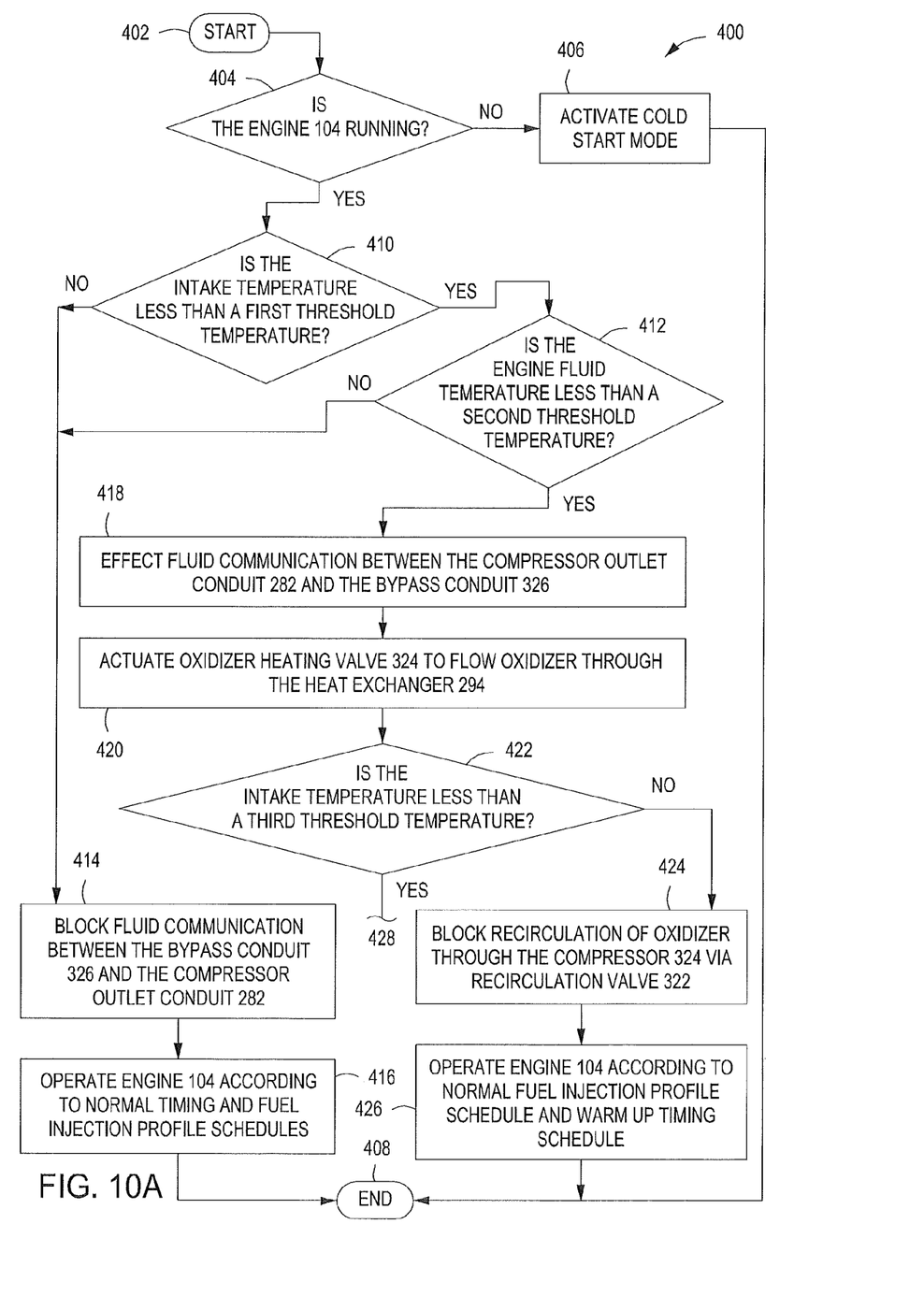
FIGS. 10A and 10B show a flowchart of a method for operating an internal combustion engine, according to an aspect of the disclosure.
Figure 10B:
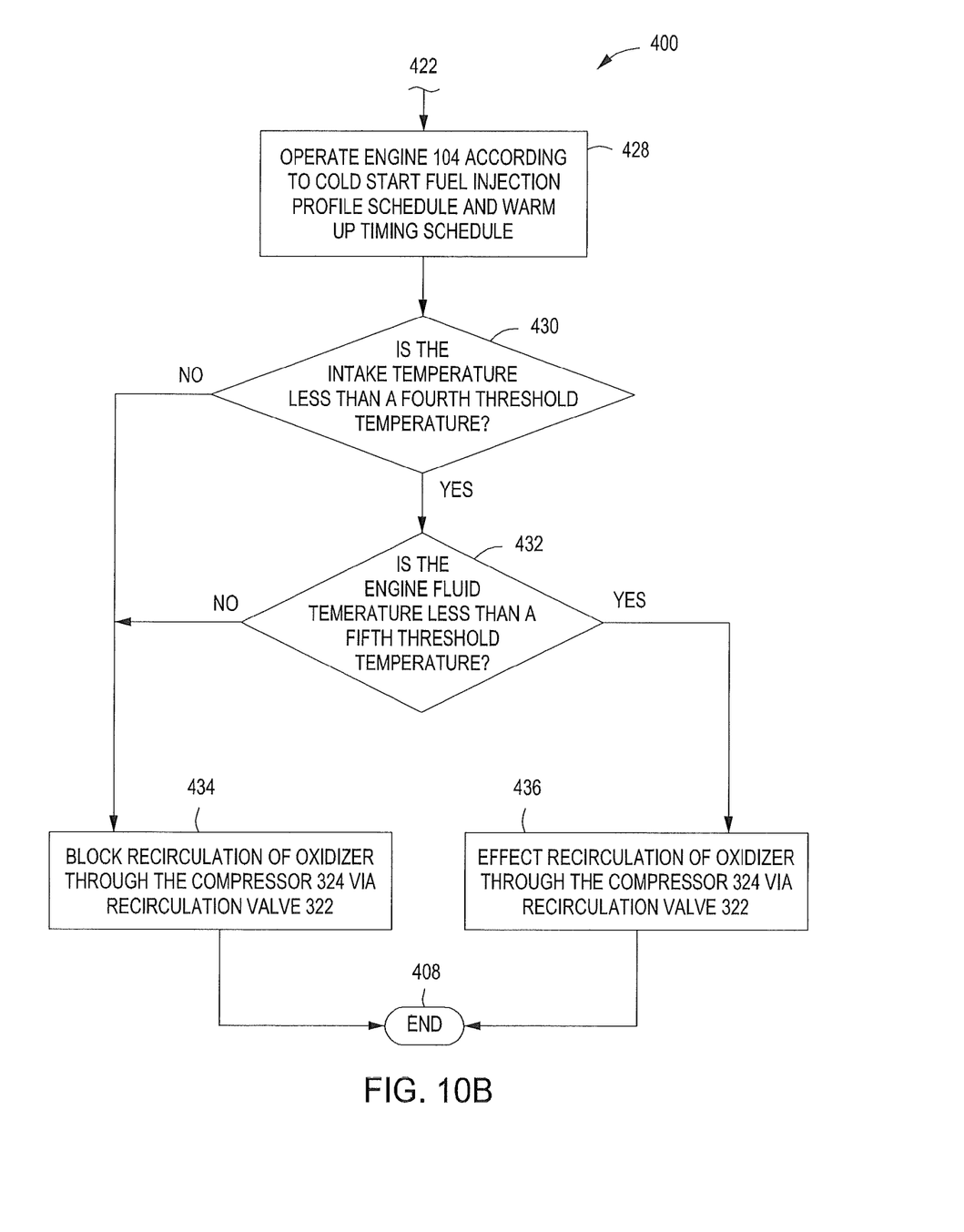

FIG. 10 is a flowchart of a method 400 for operating an internal combustion engine 104, according to an aspect of the disclosure. From the start 402, the method 400 advances to step 404 which determines whether the IC engine 104 is running. If the IC engine 104 is not already running, then the method 400 proceeds to step 406, which activates a cold start mode for the IC engine 104, and the method 400 ends at step 408.

Else, if the IC engine 104 is running the method 400 proceeds to step 410, which determines whether the intake temperature is less than a first threshold temperature. According to an aspect of the disclosure, the intake temperature is a temperature of a fluid contained within the intake duct 212. According to another aspect of the disclosure, the intake temperature is measured by the intake temperature sensor 240. A non-limiting example of the first threshold temperature is about 68 degrees Fahrenheit (20 degrees Celsius).

If the intake temperature is less than the first threshold temperature, then the method 400 proceeds to step 412, which determines whether the engine fluid temperature is less than a second threshold temperature. According to an aspect of the disclosure, the engine fluid considered in step 412 is a fluid in a closed circuit of the IC engine 104, such as engine coolant or engine lubricant. According to another aspect of the disclosure, the engine fluid temperature is measured by the engine fluid temperature sensor 242. A non-limiting example of the second temperature threshold is about 113 degrees Fahrenheit (45 degrees Celsius).

If the intake temperature is not less than the first threshold temperature in step 410, or if the engine fluid temperature is not less than the second threshold temperature in step 412, the method 400 proceeds to step 414, where fluid communication between the bypass conduit 326 and the compressor outlet conduit 282 is blocked. According to an aspect of the disclosure, fluid communication between the bypass conduit 326 and the compressor outlet conduit 282 is blocked by operation of the bypass valve assembly 320. Next, in step 416, the method 400 operates the IC engine 104 according to normal timing and fuel injection profile schedules, and the method 400 ends at step 408. Here, normal timing and fuel injection profile schedules may refer to such schedules for ambient temperature and pressure near standard values for ambient pressure and temperature as defined by the International Organization for Standardization (ISO), for example.

If the intake temperature is less than the first threshold temperature in step 410, and if the engine fluid temperature is less than the second threshold temperature in step 412, the method 400 proceeds to step 418, where fluid communication is effected between the compressor outlet conduit 282 and the bypass conduit 326. According to an aspect of the disclosure, fluid communication is effected between the compressor outlet conduit 282 and the bypass conduit 326 by operation of the bypass valve assembly 320.

Next, in step 420 a flow of oxidizer is established through the heat exchanger 294. According to an aspect of the disclosure, the flow of oxidizer is established through the heat exchanger 294 by opening the oxidizer heating valve 324.

Then in step 422, the method 400 determines whether the intake temperature is less than a third threshold temperature. According to an aspect of the disclosure, the third threshold temperature is less than the first threshold temperature. A non-limiting example of the third threshold temperature is about 32 degrees Fahrenheit (0 degrees Celsius).

If the intake temperature is not less than the third threshold temperature in step 422, then the method 400 proceeds to step 424, where recirculation of oxidizer through the compressor 234 is blocked. According to an aspect of the disclosure, recirculation of the oxidizer through the compressor 234 may be blocked by operation of the recirculation valve assembly 322.

Next, in step 426 the engine 104 is operated according to a normal fuel injection profile and a warm up timing schedule. According to an aspect of the disclosure, a warm up timing schedule includes a fuel injection timing through the direct fuel injector 252 that is later than a normal fuel injection timing. In turn, the later fuel injection timing according to the warm up schedule may increase exhaust temperature by retarding the fuel injection event. Then, the method 400 ends at step 408.

Else, if the intake temperature is less than the third threshold temperature in step 422, the method 400 proceeds to step 428, where the engine is operated according to a cold start fuel injection profile and a warm up timing schedule. According to an aspect of the disclosure, a cold start fuel injection profile may include multiple fuel injections per cycle, including but not limited to, a pilot injection close-coupled and prior to a main injection, a post injection following a main injection, or combinations thereof. According to another aspect of the disclosure, a pilot fuel injection is close-coupled to the main injection when the pilot injection begins less than or equal to 30 crank angle degrees before the main injection. The cold start fuel injection profile may act to promote more stable and complete combustion at cold conditions than would result from normal, warm ambient fuel injection profile schedules.

Next, in step 430 the method 400 determines whether the intake temperature is less than a fourth threshold temperature. According to an aspect of the disclosure, the fourth threshold temperature is less than the third threshold temperature. A non-limiting example of the fourth threshold temperature is about 5 degrees Fahrenheit (−15 degrees Celsius).

In step 432, the method 400 determines whether the engine fluid temperature is less than a fifth temperature threshold. According to an aspect of the disclosure, the fifth temperature threshold is less than the second temperature threshold. A non-limiting example of the fifth temperature threshold is about 68 degrees Fahrenheit (20 degrees Celsius).

If the intake temperature is not less than the fourth threshold temperature, or the engine fluid temperature is not less than the fifth temperature threshold, then the method 400 proceeds to step 434, where recirculation of oxidizer through the compressor 234 is blocked, for example, by operation of the recirculation valve assembly 322. If the intake temperature is less than the fourth threshold temperature, and the engine fluid temperature is less than the fifth temperature threshold, then the method 400 proceeds to step 436 where a flow of oxidizer is recirculated through the compressor 234, for example, by operation of the recirculation valve assembly 322. Following either step 434 or step 436, the method 400 proceeds to end at step 408.

Accordingly, aspects of the disclosure may provide a tiered control approach to controlling intake temperature by employing oxidizer heating through the heat exchanger 294, employing recirculation of an oxidizer flow through the compressor 234, employing cold start fuel injection profile schedules, employing warm up fuel injection timing schedules, and combinations thereof based on the intake temperature, the temperature of an engine fluid, or combinations thereof. As a result, aspects of the disclosure may provide the benefits of improved fuel economy at cold start and during engine warm up, mitigation of white smoke during cold start and warm up conditions, higher exhaust temperatures earlier during engine warm up to promote earlier emissions aftertreatment effectiveness, and facilitated aftertreatment regeneration over a wide range of operating conditions through more options for increasing exhaust temperature.

It will be appreciated that any of the methods or functions described herein may be performed by or controlled by the controller 150. Further, any of the methods or functions described herein may be embodied in a computer-readable non-transitory medium for causing the controller 150 to perform the methods or functions described herein. Such computer-readable non-transitory media may include magnetic disks, optical discs, solid state disk drives, combinations thereof, or any other computer-readable non-transitory medium known in the art. Moreover, it will be appreciated that the methods and functions described herein may be incorporated into larger control schemes for an engine, a hybrid powertrain, a machine, or combinations thereof, including other methods and functions not described herein.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A method for operating an engine system, the engine system including
    an internal combustion engine having an intake duct and an exhaust duct,
    a flow control module fluidly coupled to the intake duct,
    a compressor in fluid communication with the intake duct via the flow control module,
    a turbine in fluid communication with the exhaust duct, and
    a heat exchanger having
        an exhaust flow path in fluid communication with the exhaust duct, the exhaust flow path being disposed downstream of the turbine along an exhaust flow direction through the exhaust duct, and
        an oxidizer flow path, an outlet of the compressor being in selective fluid communication with the intake duct via the flow control module and the oxidizer flow path of the heat exchanger,
    the method comprising:
    actuating the flow control module between a first configuration and a second configuration based at least in part on an oxidizer temperature,
    the first configuration of the flow control module blocking fluid communication between the oxidizer flow path of the heat exchanger and the outlet of the compressor, and
    the second configuration of the flow control module effecting fluid communication between the oxidizer flow path of the heat exchanger and the outlet of the compressor.

2. The method of claim 1, further comprising blocking fluid communication between the outlet of the compressor and an inlet of the compressor via the flow control module, and blocking fluid communication between the outlet of the compressor and the heat exchanger via the flow control module when the oxidizer temperature is not less than a first threshold value.

3. The method of claim 2, further comprising blocking fluid communication between the outlet of the compressor and the inlet of the compressor via the flow control module, and blocking fluid communication between the outlet of the compressor and the heat exchanger via the flow control module when an engine fluid temperature is not less than a second threshold value, the second threshold value being greater than the first threshold value.

4. The method of claim 1, further comprising effecting fluid communication between the outlet of the compressor and the heat exchanger via the flow control module when the oxidizer temperature is less than a first threshold value.

5. The method of claim 4, further comprising recirculating a flow of oxidizer through the compressor via the flow control module when the oxidizer temperature is less than a second threshold value, the second threshold value being less than the first threshold value.

6. The method of claim 5, further comprising recirculating a flow of oxidizer through the compressor via the flow control module when the oxidizer temperature is less than the second threshold value, and an engine fluid temperature is less than a third threshold value, the third threshold value being greater than the second threshold value.

7. The method of claim 4, further comprising effecting fluid communication between the outlet of the compressor and the heat exchanger via the flow control module when the oxidizer temperature is less than the first threshold value and an engine fluid temperature is less than a second threshold value, the second threshold value being greater than the first threshold value.

8. The method of claim 4, further comprising retarding a fuel injection timing of the internal combustion engine when the oxidizer temperature is less than a second threshold value, the second threshold value being less than the first threshold value.

9. A machine, comprising:
    an internal combustion engine having an intake duct and an exhaust duct;
    a flow control module fluidly coupled to the intake duct;
    a compressor in fluid communication with the intake duct via the flow control module;
    a turbine in fluid communication with the exhaust duct;
    a heat exchanger having
        an exhaust flow path in fluid communication with the exhaust duct, the exhaust flow path being disposed downstream of the turbine along an exhaust flow direction through the exhaust duct, and
        an oxidizer flow path, an outlet of the compressor being in selective fluid communication with the intake duct via the flow control module and the oxidizer flow path of the heat exchanger;
    a first temperature sensor in fluid communication with the intake duct; and
    a controller operatively coupled to the flow control module and the first temperature sensor, the controller being configured to actuate the flow control module between a first configuration and a second configuration based at least in part on a signal from the first temperature sensor,
    the first configuration of the flow control module blocking fluid communication between the oxidizer flow path of the heat exchanger and the outlet of the compressor, and
    the second configuration of the flow control module effecting fluid communication between the oxidizer flow path of the heat exchanger and the outlet of the compressor.

10. An engine system, comprising:
    an internal combustion engine having an intake duct and an exhaust duct;
    a flow control module fluidly coupled to the intake duct;
    a compressor in fluid communication with the intake duct via the flow control module;
    a turbine in fluid communication with the exhaust duct;
    a heat exchanger having
        an exhaust flow path in fluid communication with the exhaust duct, the exhaust flow path being disposed downstream of the turbine along an exhaust flow direction through the exhaust duct, and
        an oxidizer flow path, an outlet of the compressor being in selective fluid communication with the intake duct via the flow control module and the oxidizer flow path of the heat exchanger;
    a first temperature sensor in fluid communication with the intake duct; and
    a controller operatively coupled to the flow control module and the first temperature sensor, the controller being configured to actuate the flow control module between a first configuration and a second configuration based at least in part on a signal from the first temperature sensor, the first configuration of the flow control module blocking fluid communication between the oxidizer flow path of the heat exchanger and the outlet of the compressor, and the second configuration of the flow control module effecting fluid communication between the oxidizer flow path of the heat exchanger and the outlet of the compressor.

11. The engine system of claim 10, wherein the second configuration of the flow control module effects fluid communication between an inlet of the compressor and the outlet of the compressor via a recirculation conduit.

12. The engine system of claim 10, wherein the second configuration of the flow control module blocks fluid communication between an inlet of the compressor and the outlet of the compressor via a recirculation conduit.

13. The engine system of claim 10, further comprising a second temperature sensor in fluid communication with a cooling system of the internal combustion engine, the controller being operatively coupled to the second temperature sensor, wherein the controller is further configured actuate the flow control module between the first configuration and the second configuration based at least in part on a signal from the second temperature sensor.

14. The engine system of claim 10, wherein the first temperature sensor has a sensing element disposed within the intake duct.

15. The engine system of claim 10, wherein the outlet of the compressor is in fluid communication with intake duct via a first intake conduit, and the oxidizer flow path of the heat exchanger is in fluid communication with the intake duct via a second intake conduit, the first intake conduit being distinct from the second intake conduit.

16. The engine system of claim 15, wherein the flow control module includes an intake bypass valve assembly fluidly coupled to the outlet of the compressor, an inlet of the compressor, and the intake duct via a first intake conduit, the intake bypass valve assembly being configured to effect selective fluid communication between the outlet of the compressor and the inlet of the compressor, the intake bypass valve assembly being operatively coupled to the controller.

17. The engine system of claim 16, wherein the intake bypass valve assembly is fluidly coupled to the oxidizer flow path of the heat exchanger, and wherein the flow control module further includes an oxidizer heating valve, the oxidizer flow path of the heat exchanger being fluidly coupled to the intake duct via the oxidizer heating valve and the second intake conduit.

18. The engine system of claim 16, wherein the oxidizer flow path of the heat exchanger is fluidly coupled to the intake duct via the second intake conduit, and wherein the flow control module further includes a oxidizer heating valve, the intake bypass valve assembly being fluidly coupled to the oxidizer flow path of the heat exchanger via the oxidizer heating valve.

19. The engine system of claim 10, wherein the heat exchanger effects thermal communication between the oxidizer flow path and the exhaust flow path therein, and wherein the oxidizer flow path is free from fluid communication with the exhaust flow path within the heat exchanger.

* * * * *